United States Patent
Habermann et al.

(10) Patent No.: US 6,571,553 B1
(45) Date of Patent: Jun. 3, 2003

(54) HYDRAULIC CONTROL ARRANGEMENT FOR OPERATING A WINCH WITH EASING, HOISTING AND MOORING MODES

(75) Inventors: Heinz Habermann, Lohr/Main (DE); Wilhelm Kastel, Rellingen (DE)

(73) Assignee: Bosch Rexroth AG, Lohr/Main (DE)

( * ) Notice: Subject to any disclaimer, the term of this patent is extended or adjusted under 35 U.S.C. 154(b) by 0 days.

(21) Appl. No.: 09/937,252

(22) PCT Filed: Mar. 2, 2000

(86) PCT No.: PCT/EP00/01777

§ 371 (c)(1),
(2), (4) Date: Sep. 19, 2001

(87) PCT Pub. No.: WO00/57065

PCT Pub. Date: Sep. 28, 2000

(30) Foreign Application Priority Data

Mar. 24, 1999 (DE) .......................................... 199 13 275

(51) Int. Cl.[7] .............................................. F16D 31/02
(52) U.S. Cl. ..................... 60/443; 254/361; 242/390.6
(58) Field of Search ..................... 60/443, 444, 493; 254/361; 242/390.5, 390.6

(56) References Cited

U.S. PATENT DOCUMENTS

| | | | | |
|---|---|---|---|---|
| 2,008,687 A | * | 7/1935 | Dean .......................... | 254/361 |
| 4,088,304 A | * | 5/1978 | Gradert ...................... | 254/291 |
| 4,398,698 A | * | 8/1983 | Crawford et al. ........... | 254/361 |
| 4,624,450 A | | 11/1986 | Christison | |

FOREIGN PATENT DOCUMENTS

| | | |
|---|---|---|
| DE | 2507947 | 9/1976 |
| EP | 0331177 | 9/1989 |

OTHER PUBLICATIONS

RD 65 050/03.96 Mannesmann Rexroth.

* cited by examiner

Primary Examiner—F. Daniel Lopez
(74) Attorney, Agent, or Firm—Martin A. Farber

(57) ABSTRACT

A hydraulic control arrangement for operating a winch with an adjustable hydraulic motor in the easing, hoisting and mooring modes. The arrangement comprises a pilot controller with a control lever which can be actuated as desired and can be deflected from a neutral position in opposite directions over a specific easing angle range and over a specific hoisting angle range. Previously, for the mooring mode, the control lever was blocked at a desired point in the hoisting angle range. The control lever, as viewed from the neutral position, can be deflected over a mooring angle range on the other side of the hoisting angle range, with increasing deflection of the control lever in the mooring angle range, the hydraulic motor being adjusted in the direction of a greater absorption volume and therefore in the direction of a greater torque and increased tension on the hawser. This contradicts the usual concept that as the deflection of a control lever increases, that is as the pivoting angle increases, the variable controlled by it also increases.

20 Claims, 4 Drawing Sheets

HYDRAULIC CONTROL ARRANGEMENT FOR OPERATING A WINCH WITH EASING, HOISTING AND MOORING MODES

FIELD AND BACKGROUND OF THE INVENTION

The invention is based on a hydraulic control arrangement which is used to operate a winch in easing, hoisting and mooring modes and which has an adjustable hydraulic motor (12) to drive the winch (10), a proportionally adjustable directional control valve (35), spring-centered in a mid position, to control the flow paths of a pressure medium between a pressure medium source (25), the hydraulic motor (12) and a pressure medium supply container (26), a pilot controller (65) which is used to control the adjustment of the directional control valve (35) and of the hydraulic motor (12) and has a control lever (81) which can be actuated as desired and can be deflected from a neutral position in one direction over a specific easing angle range (85) for easing at different speeds and can be deflected in the opposite direction over a specific hoisting angle range (86) for hoisting at different speeds, during a deflection of the control lever (81) over the entire hoisting angle range (86), the directional control valve (35) being fully opened and the hydraulic motor (12) being adjusted to a minimum absorption volume.

A hydraulic control arrangement of this type is disclosed by the typesheet RD 65 050/03.96 from the applicant. In such a control arrangement, the winch is preferably driven by an adjustable hydraulic motor. Using a directional control valve which is pilot-controlled, proportionally adjustable and spring-centered in a mid position, the flow paths of a pressure medium are controlled between a pressure medium source, the hydraulic motor and a pressure medium storage container. To control the adjustment of the directional control valve and of the hydraulic motor, use is made of a pilot controller having a control lever which can be actuated as desired and can be deflected from a neutral position in one direction over a specific easing angle range for easing at different speeds, and can be deflected in the opposite direction over a specific hoisting angle range for hoisting at different speeds. In the process, two adjustments are involved in changing the speed of the winch. Firstly, during a deflection of the control lever, the directional control valve is opened further and further, so that the amount of pressure medium flowing to the hydraulic motor is increased further and further. Secondly, the absorption volume of the hydraulic motor is reduced. It is conceivable to change the opening cross section of the directional control valve and the absorption volume of the hydraulic motor in parallel with each other. In the prior art, however, provision is made that, up to a pilot control pressure of 18 bar, for example, only the hydraulically pilot-controlled directional control valve is adjusted and, in the range of a pilot control pressure from 20 to 30 bar, for example, only the adjustable hydraulic motor is adjusted.

In the mooring mode, the hawser is to be kept under a predefinable tension. This tension can be set by means of the absorption volume of the hydraulic motor. In the prior art, the control lever of the pilot controller is deflected from a neutral position counter to the force of a restoring spring in one direction for the hoisting mode of the winch and in the other direction for the easing mode of the winch. For the mooring mode, which is generally intended to be maintained over a relatively long time period without the control lever being held in a specific position by hand, a fixing brake is provided for the control lever in the known hydraulic control arrangement, said brake holding the control lever within the hoisting angle range, counter to the force of the restoring spring, in a position corresponding to a specific absorption volume of the hydraulic motor.

In the case of the known hydraulic control arrangement, in the hoisting mode, the variable to be set, namely the speed of the hawser, becomes greater as the deflection angle of the control lever increases. In the mooring mode, the variable to be set is the torque exerted by the hydraulic motor. This torque decreases with increasing deflection angle of the control lever, a behavior which contradicts the usual concepts of setting a variable via a control lever, and can therefore lead to wrong setting. Another drawback of the known hydraulic control is that the hoisting mode and mooring mode cannot be distinguished by using the position of the control lever.

SUMMARY OF THE INVENTION

The invention is based on the object of constructing a hydraulic control arrangement which has the introductory-mentioned features in such a way that a type of mooring mode corresponding to the usual concept is possible.

In a hydraulic control having the introductory-mentioned features, according to the invention, the intended object is achieved wherein, the control lever, as viewed from the neutral position, can be deflected over a mooring angle range on the other side of the hoisting angle range, wherein and, with increasing deflection of the control lever in the mooring angle range, the hydraulic motor is adjusted in the direction of a greater absorption volume. Therefore, with increasing deflection of the control lever, the torque that can be exerted by the hydraulic motor increases, which corresponds to the usual concept of a control system and reduces the probability of wrong control. In addition, the angle range in which the control lever is located for hoisting and the angle range for the mooring mode are separated from each other, so that a reference to a different mode of operation can already be taken from the position of the control lever.

Thus according to another feature of the invention, during an adjustment of the control lever from the hoisting angle range into the mooring angle range a considerable rise in torque is preferably detectable, so that it is clearly pointed out to the operator that he is leaving the hoisting angle range with the control lever and passing into the mooring angle range.

As already outlined, a winch is often operated in the mooring mode over a relatively long time period, for example during the period during which a ship is lying in a harbor. In order that a person does not have to hold the control lever fixed during this entire time, provision is expediently also made in a control arrangement according to the invention as in the known hydraulic control arrangement, for the control lever to be capable of being brought into a position for the mooring mode from which it does not automatically return into the neutral position. The possibility of leaving the control lever in a specific position provides a temptation to operate a winch contrary to the regulations. This is because a person can use the mooring mode to haul in the hawser by the person first moving the control lever into a specific position in the mooring angle range and then attempting to do something at the hawser or at the load. It is therefore beneficial if, in the mooring mode, the speed with which the hawser can be hauled in is limited to a small value. According to a feature of the invention, a hydraulic control arrangement according to the invention is equipped with a nozzle and a second directional control valve for such a speed limitation, it being possible for this second directional control valve, at the transition of the control lever from the hoisting angle range to the mooring angle range, to be changed over into a mooring position in which the nozzle is located in the flow path of the pressure medium leading via the hydraulic motor, with the effect of limiting the rotational speed of the hydraulic motor to small values. Such a limitation on the rotational speed of the hydraulic motor is primarily advantageous for the direction of rotation in which the hawser is wound up. If a hawser breaks, for example in the mooring mode, then winding up takes place only at the limited speed so that the loose cable does not thrash about wildly in the surrounding area and endanger personnel. In addition, in the case of the winch being operated contrary to the regulations, during which operation a load is moved in the mooring mode, the speed is only low and therefore the hazard to personnel is low.

According to other features of the invention, the nozzle and the second directional control valve are preferably arranged in series with each other and in a bypass line to the first directional control valve, the first directional control valve, at the transition of the control lever from the hoisting angle range to the mooring angle range, being brought into a mid position in which the feed of pressure medium to the hydraulic motor under pressure is blocked by the first directional control valve. It is intrinsically also conceivable to arrange the parallel circuit of a nozzle and of the second directional control valve in series with the first directional control valve. The second directional control valve would then be completely open in the hoisting mode and closed in the mooring mode. However, it would have to be designed for the maximum quantity of pressure medium flowing to the hydraulic motor and to be dimensioned to be accordingly large. By contrast, in the case of a construction according to features of the invention, the second directional control valve can be relatively small.

According to FIG. 5, the pilot controller is a hydraulic pilot controller and the first directional control valve can be actuated hydraulically. As a result, in the event of an adjustment of the control lever into the mooring angle range, said first directional control valve is moved into its mid position by both pilot control chambers being acted on with the same pilot control pressure, also present on the hydraulic motor. This simplifies the control arrangement as compared with a different solution, in which, in order to return the first directional control valve into the mid position, its two pilot control chambers are relieved of pressure. This is because the two control lines leading from the pilot controller to the first directional control valve are usually also connected to the two inputs of a changeover valve, from the output of which a control line leads to the adjusting device of the hydraulic motor. Via the changeover valve, a pilot control pressure present in the one pilot control chamber or in the other pilot control chamber of the first directional control valve is supplied to the adjusting device of the hydraulic motor. If it were then desired to relieve the two pilot control chambers of the directional control valve to the tank, then the second directional control valve would have to be used to separate the input of the changeover valve on which a pilot control pressure for the hydraulic motor prevails in the hoisting mode, from the corresponding pilot control chamber of the directional control valve, and the pilot control chambers could be relieved separately to the tank. This would make a tank connection on the directional control valve and a tank duct necessary. Particularly advantageous in this case is the construction according to further features of the invention if, the pilot controller comprises an adjustable pilot valve with a pilot control pressure connection which can be connected to various pilot control chambers of the first directional control valve via a directional control valve that is operated by the deflection of the control lever. A pilot controller with a pilot valve whose pilot control pressure connection can be connected via a directional control valve to one or the other pilot control chamber of a proportionally adjustable directional control valve provides the advantage that the behavior of the pilot control is not influenced in a different way by tolerances in the pilot valve, irrespective of the direction in which the control lever is deflected from its neutral position. If, therefore, for example the pilot control valve is in each case actuated in the same way as a function of the angle, irrespective of the direction, during a deflection of the control lever from the neutral position then, in the event of the same deflection angle, the pilot control pressures are also equal. When the pilot valve is set, the pilot control pressure in the two deflection directions are influenced in the same way.

For load-independent control of the rotational speed of a winch, a feed metering diaphragm of the proportionally adjustable directional control valve is assigned a pressure compensator that maintains a fixed pressure difference across the feed metering diaphragm. The bypass line then advantageously circumvents both the pressure compensator and the directional control valve. One control side of the pressure compensator can then be connected in a straight-forward way to a connection of the directional control valve, via which a brake on the winch can have pressure applied to it and which, in the mid position of the directional control valve, is relieved of pressure in order that the brake can engage. However, it is also conceivable to connect one control side of the pressure compensator via a changeover valve to one or the other connection of the hydraulic motor and to permit the bypass line to branch off downstream of the pressure compensator, so that only the directional control valve is circumvented. The pressure compensator and nozzle in the bypass line then together form a flow control valve, so that in the mooring mode, one has flow regulation for the pressure medium flowing from the pressure medium source to the hydraulic motor.

In the bypass line, according to features of the invention, there is advantageously a nonreturn valve, which opens in the direction of the flow of pressure medium from the pressure medium source to the hydraulic motor. In addition, there is a pressure limiting valve, which is arranged between the two connections of the hydraulic motor and by means of which the pressure of the connection of the hydraulic motor to which pressure is applied in the mooring mode is limited to a maximum value. When the cable is being let out in the mooring mode, pressure medium flows from the connection of the hydraulic motor to which pressure is applied to the other connection on a short path, via the pressure limiting valve. The hydraulic motor does not have to take up a large quantity of pressure medium via long lines, which would be associated with the risk of cavitation. If the control pressure is supplied internally via a pressure reducing valve, then the latter is connected by its pressure connection to the bypass line, specifically upstream of the nozzle, according to features of the invention the nonreturn valve being arranged between the pressure connection and the pressure medium source.

In the known hydraulic control arrangement for a winch, a hydraulically vented mechanical brake is supplied with pressure medium via a changeover valve from the two motor valve connections of the proportionally adjustable directional control valve. In the mid position of the directional control valve, both motor valve connections of the directional control valve, and therefore also the brake, are relieved to the tank, so that the brake can engage. In accordance with the construction according to features of the invention, the proportionally adjustable directional control valve is in its mid position in the mooring mode, the intention being for a supply of pressure medium to the hydraulic motor to be possible via the bypass line, and therefore one motor valve connection of the proportional directional control valve is advantageously not relieved to the tank when in its mid position, in order not to need a further valve between this motor valve connection and the branch point of the bypass line. According to further features of the invention, therefore, in the mooring mode, the brake is advantageously supplied with pressure medium via the second directional control valve and can also be relieved of pressure via the second directional control valve when the control lever is put into its neutral position. It is therefore essential here that the hydraulic brake actuator can have pressure applied to it and can be relieved of pressure in the mid position of the proportional directional control valve, independently of the latter.

As in the prior art, according to features of the invention, there is a nonreturn device for the control lever, which comprises a restoring spring which, in the easing and hoisting angle range, is prestressed to a greater extent as the deflection of the control lever increases, so that in the aforementioned angle ranges, a restoring force is exerted on the control lever. Adjusting the control lever in the mooring angle range, on the other hand, is indifferent with regard to the prestressing of the restoring spring. Therefore, in the mooring angle range, the latter does not exert any restoring force on the control lever either. This renders a separate fixing brake for the control lever superfluous. Advantageous refinements of the restoring device, referring to the presence and absence of a restoring force, and a cam disk which is coupled to the control lever so as to be secure against rotation and collaborates with the restoring spring are provided. Here, reference is made in particular to the configuration according to features of the invention, according to which, in the mooring angle range, a pressure piece of the restoring device is pressed against the cam disk by a second spring in addition to the restoring spring. This increases the frictional force between the pressure piece and the cam disk, so that a small torque exerted on the control lever by a pilot valve certainly does not lead to any adjustment of the control lever.

The hydraulic control arrangement according to the invention is used for the purpose of operating a winch in the easing, hoisting and mooring mode. For many winches, however, no mooring mode is envisaged. In order to be able to use the same components in the pilot controller as those for a winch with a mooring mode, in the development of a hydraulic control arrangement according to the invention and according to further features of the invention, provision is made for the deflection of the control lever at the end of the easing angle range and at the end of the mooring angle range in each case to be limited by a stop face on a part that corotates with the control lever, and an opposing stop, and for the pressure piece to have an additional stop which, depending on the type of installation of the pressure piece and/or of an opposing stop, limits the path of the pressure piece in the direction of more intensive prestressing of the restoring spring at the end of the hoisting angle range (winch without mooring mode) or does not limit the same (winch with mooring mode).

BRIEF DESCRIPTION OF THE DRAWINGS

Further advantageous refinements of a hydraulic control arrangement according to the invention emerge from the description which now follows of an exemplary embodiment which is illustrated in the drawing, in which.

A DETAILED DESCRIPTION OF THE PREFERRED EMBODIMENT

Figure 1:
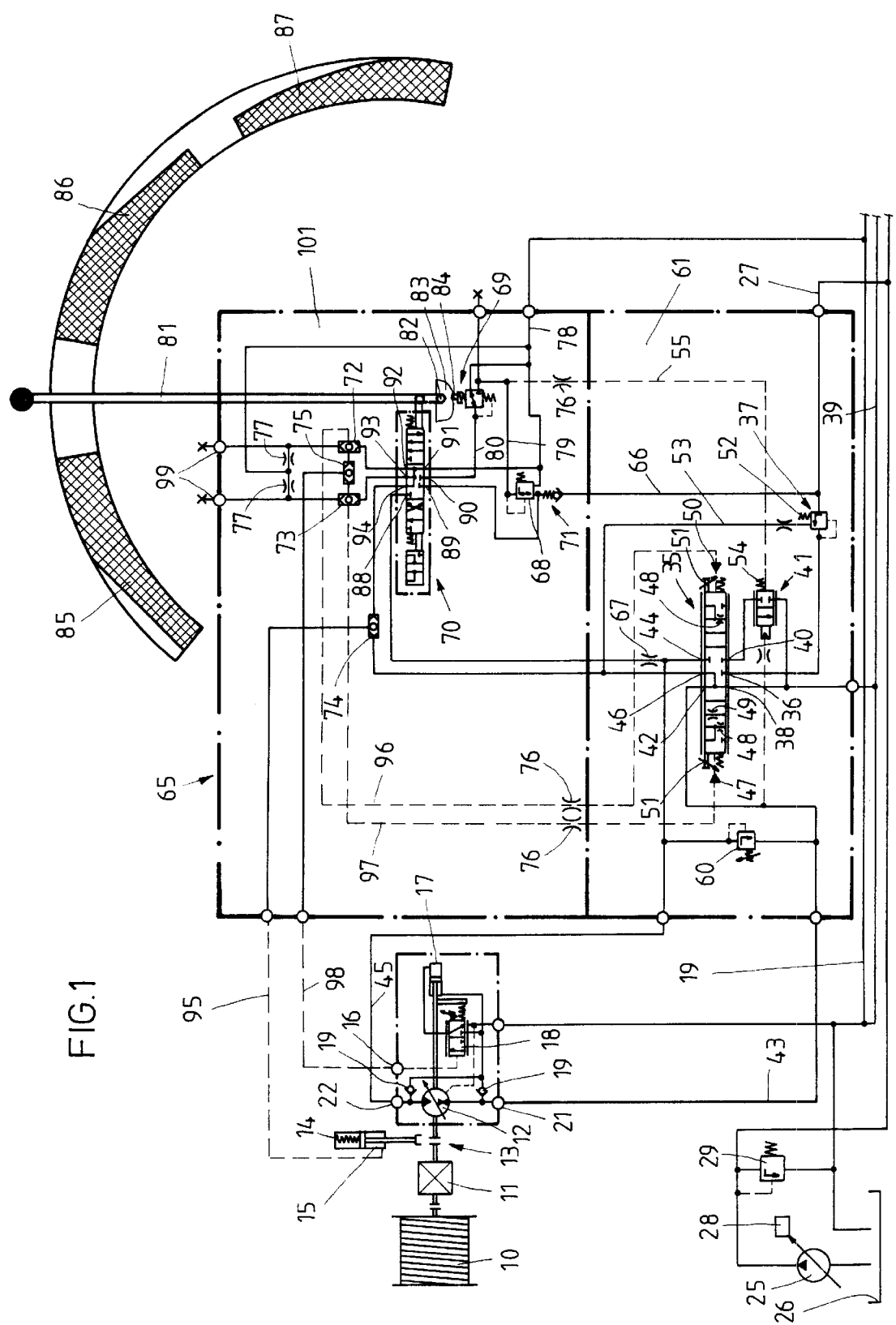
FIG. 1 shows the exemplary embodiment in a circuit diagram, in which the control lever and the angle ranges in which the control lever is located during the various modes of operation are also shown schematically.

FIG. 1 reveals a winch 10, which can be driven in opposite directions via a gearbox 11 via an adjustable hydraulic motor 12. Arranged between the output shaft of the hydraulic motor and the gearbox is a brake 13, which can be actuated via a single-acting hydraulic cylinder 14. The hydraulic cylinder 14 is constructed in the manner of a differential cylinder, whose piston and piston rod can be displaced by a spring with the effect of engaging the brake. By applying pressure medium to the annular chamber 15 of the hydraulic cylinder 14, piston and piston rod are moved back counter to the force of the spring and, as a result, the brake 13 is released. The absorption volume of the hydraulic motor 12 may be adjusted continuously on the basis of a control pressure applied to the control input 16, and is smaller the greater the control pressure. For the adjustment, there are an actuating cylinder 17 constructed as a differential cylinder and a pump control valve 18. The latter has a tank connection, which is connected to a leakage oil line 19, a pressure connection which is connected via two nonreturn valves 20 to the motor connection 21 or 22, respectively, and a cylinder connection connected to the pressure chamber, on the side remote from the piston rod, of the actuating cylinder 17. The pressure chamber on the piston rod side of the actuating cylinder 17 is connected to the pressure connection of the pump control valve 18. The piston slide of the pump control valve 18 is acted on with the effect of connecting the cylinder connection to the pressure connection of the control pressure and with the effect of connecting the cylinder connection to the tank connection by a first compression spring, set to a fixed value, and by a second compression spring whose prestress changes with the position of the piston and the piston rod of the actuating cylinder 17. The piston and piston rod of the actuating cylinder 17 therefore in each case assume a position such that the force generated as a result of the applied control pressure and the pressure generated by the springs maintain the equilibrium of the piston of the pump control valve 18. In this way, a specific absorption volume of the hydraulic motor 12 can be set by means of the control pressure.

The source for the pressure medium which is fed to the hydraulic motor 12 is a displacement pump 25, which takes hydraulic oil from a tank 26 and discharges it into a feed line 27. The displacement pump 25 is provided with a pressure controller 28, and therefore, when the pressure set on the pressure regulator 28 is reached in the feed line 27, pivots back to a swept volume which is sufficient to maintain the set pressure in the feed line 27. In order to safeguard the entire control arrangement against excessively high pressures, a pressure limiting valve 29 is connected to the feed line 27. The maximum swept volume of the displacement pump is designed in such a way that said pump is not pivoted as far as the stop even if, taking account of a simultaneous actuation of a plurality of hydraulic loads, the maximum quantity of pressure medium is requested.

The rotational speed at which the hydraulic motor 12 rotates and the direction of rotation can be controlled by a proportionally adjustable directional control valve 35. This is spring-centered into a mid position and can be actuated hydraulically. It has a total of six connections, namely a feed connection 36, to which pressure medium can flow from the feed line 27 via a pressure compensator 37, an outlet connection 38, which is connected directly to a tank line 39, a second outlet connection 40, which is connected via a brake valve 14 to the tank line 39, a first load connection 42, which is connected via a load line 43 to the motor connection 21, a second load line 44, which is connected via a load line 45 to the motor connection 22, and a brake connection 46, via which pressure medium can be applied to the annular chamber 15 of the hydraulic cylinder 14.

In the spring-centered mid position of the directional control valve 35, its connections 36, 40 and 44 are blocked off. The connections 42 and 46 are connected to the connection 38 and therefore to the tank 26. By applying a control pressure to a first control chamber 47, the valve piston of the directional control valve 35 is displaced to a different extent, depending on the level of the control pressure, into a first operating position, in which the outlet connection 38 is blocked off. The load connection 42 and the brake connection 46 are jointly connected to the feed connection 36 via a feed metering diaphragm 48, whose opening cross section depends on the extent of the displacement of the valve piston. The load connection 44 is connected via an outlet restrictor 49 to the outlet connection 40. If the control chamber 47 is relieved of pressure, and if a second control chamber 50 has a control pressure applied to it, then the valve piston of the directional control valve 35 passes to a different extent from the mid position into a second operating position, in which the load connection 42 is connected in an unrestricted manner to the outlet connection 38. The brake connection and the other load connection 44 are jointly connected to the feed connection 36 via the feed metering diaphragm 48. The outlet connection 40 is blocked off. The maximum displacement travel of the valve piston in the two opposite directions is limited by adjustable stops 51.

According to the connections outlined, the pressure compensator 37 is arranged between the various connections of the directional control valve 35 in the two operating positions of the latter, in each case upstream of the feed metering diaphragm 48. The control piston of the pressure compensator 37 is acted on in the closing direction by the pressure upstream of the feed metering diaphragm and in the opening direction by a compression spring 52 and by a pressure which is applied via a control line 53, which is connected to the brake connection of the directional control valve and therefore in each case to the load connection 42 or 44 of the directional control valve 35 in the flow to the hydraulic motor 12. The pressure is therefore in each case equal to the pressure downstream of the feed metering diaphragm 48. The pressure compensator 37 therefore controls a specific pressure difference, equivalent to the force of the spring 52, across the feed metering throttle 48. The quantity of pressure medium flowing via the feed metering diaphragm 48 therefore depends only on the opening cross section of the feed metering diaphragm and is independent of the load pressure and of the pump pressure.

The control piston of the brake valve 41 is acted on in the opening direction by the pressure present on the load connection 42 of the directional control valve 44 and therefore also present in the load line 43 and at the motor connection 21, and is acted on in the closing direction by the force of a compression spring 54 and by a pilot control pressure applied via a control line 55, which is constantly in the region of 40 bar, for example. The two pressures act on equally large areas, so that under a pulling load, the brake valve 41, together with the restrictor 49, restricts the outflow of pressure medium from the hydraulic motor 12 via the load line 45 in each case to such a great extent that, in the load line 43, a pressure is built up which produces a force on the control piston of the brake valve which maintains the equilibrium of the force of the compression spring 54 and the force generated by the pilot control pressure. The rotational speed of the hydraulic motor 12 is therefore also determined by the opening cross section of the feed metering diaphragm 48 when under a pulling load. In addition, the pressure on the brake connection 46 of the directional control valve 35 is so high under a pulling load that the brake 13 remains released.

Arranged between the two load lines 43 and 45 is a pressure limiting valve 60, which is set to a pressure which is about 10–20 bar above the pressure controlled by the displacement pump 25, but below the set pressure of the pressure limiting valve 29.

The directional control valve 35, the pressure compensator 37, the brake valve 41 and the pressure limiting valve 60 are accommodated in a valve plate 61. Built up on the latter is a pilot controller 65, via which a bypass line 66 which can be blocked off leads, which originates from the feed line 27 upstream of the pressure compensator 37 and opens into the load line 45, that is to say circumvents the pressure compensator 37 and the directional control valve 35. Located in the bypass line 66 is a throttle 67, which is located in the plate 61 and through which the quantity of pressure medium which can flow to the hydraulic motor 12 via the bypass line 66 is limited to about 10% of the quantity of pressure medium which flows to the hydraulic motor 12 via the directional control valve 35 when the feed metering diaphragm 48 is at its maximum opening.

The pilot controller 65 contains two pressure reducing valves 68 and 69, a directional control valve 70, a nonreturn valve 71, various changeover valves 72, 73, 74 and 75, two damping nozzles 76, two relief nozzles 77 and various ducts for connecting the valves to one another. The nonreturn valve 71 is in the bypass line 66 and blocks toward the feed line 27. Downstream of the nonreturn valve 71, the pressure reducing valve 68 is connected to the bypass line 66 by its pressure connection. A relief connection of the pressure control valve 68 is connected to a leakage duct 78. The pressure reducing valve 68 is set to a fixed value and, at its control output and in a pilot control pressure supply duct 79, to which the control line 55 leading to the brake valve 41 is also connected, for example controls the aforementioned pressure at the level of 40 bar. The second pressure reducing valve 69, which is connected by its pressure connection to the duct 79, by its relief connection to the duct 78 and by its control output to a pilot control pressure duct 80, can be adjusted by pivoting a control lever 81 from a neutral position. The pivot axis of the control lever 81 is designated by 82. Fixed to the control lever is a control disk 83 having a control cam on which an actuating plunger 84 of the pressure reducing valve 69 bears. The control cam is configured such that when the control lever is pivoted from the neutral position, first of all the pressure reducing valve 69 is adjusted in the same way, irrespective of the pivoting direction. To be specific, the pilot control pressure in the duct 80 increases continuously, starting from a pivoting angle of about 8 degrees up to a pivoting angle of 45 degrees, even if not necessarily with the same slope everywhere. The pivoting angle of the control lever 81 is limited to about 50 degrees for the pivoting in one direction. In this direction, the control lever is pivoted for the purpose of easing, that is to say for unwinding the hawser from the winch 10. Pivoting the control lever in the other direction is carried out for the purpose of hoisting, that is to say when the hawser is to be wound up on the winch 10. In this case, both when being pivoted in the direction of easing and when being pivoted in the direction of hoisting, the control lever 81 pivots back into its neutral position again, because of a restoring device acting on it, when it is released. In the hoisting direction, however, the control lever can be pivoted up to a pivoting angle of about 100 degrees, remaining in the position assumed by it when it is pivoted over about 54 degrees, even when it is released. In this range, the winch 10 is operated in the mooring mode. The three angular ranges of easing, hoisting and mooring are indicated hatched in FIG. 1 and provided with reference numbers 85 for easing, 86 for hoisting and 87 for mooring. Here, the control disk 83 is configured such that in the mooring angle range 87 the pressure in the duct 80 decreases as the pivoting angle of the control lever 81 increases.

The directional control valve 70 is actuated mechanically by the control lever 81. Its movable valve element is not specifically illustrated, but is preferably constructed as a rotary disk, whose axis of rotation coincides with the axis 82 of the control lever 81. It can assume a total of four functionally distinguishable switching positions and has 7 connections, of which two connections 88 and 89 are downstream of the nonreturn valve 71 and upstream of the nozzle 67 in the bypass line 66. The pilot control pressure duct 80 leads to one connection 90. One connection 91 is connected to the leakage duct 78. The three remaining connections 92, 93 and 94 each lead to a first input of a changeover valve 72, 73 and 74, respectively. The second input of the changeover valve 74 is connected to the brake connection 46 of the directional control valve 35. A line 95 leads from the output of the changeover valve to the annular chamber 15 of the hydraulic cylinder 14. The second input of each of the two changeover valves 72 and 73 is respectively connected to an external connection 95, which is closed in the present case but offers the possibility of controlling the winch with a second pilot controller, which is arranged at a distance from the block comprising the plate 61 and the pilot controller 65. For the case of this remote control, and for the case of small pilot control pressures, the line between the connection 46 of the directional control valve 35 and the changeover valve 74 is needed, since the annular chamber 15 of the hydraulic cylinder 14 can then be pressurized via this line. From the output of the changeover valve 72, a control line 96 leads via a damping nozzle 76 to the control chamber 50, and from the output of the changeover valve 73, likewise via a damping nozzle 76, a control line 97 leads to the control chamber 47 of the directional control valve 35. The changeover valve 75 is connected by one input to the output of the changeover valve 72 and by its other input to the output of the changeover valve 73. Its output is connected via a control line 98 to the control input 16 of the hydraulic motor 12.

In the neutral position of the control lever 81, the directional control valve 70 assumes a position in which the connections 88, 89 and 90 are blocked off and the other connections are connected to the tank duct 78. The bypass line 66 is therefore blocked. The control lines 95, 96, 97 and 98 are relieved of pressure in relation to the duct 78. The directional control valve 35 is therefore in its mid position. The hydraulic motor 12 is at maximum absorption volume. The brake 13 is engaged.

The control lever is then adjusted into the angle range 85 for easing. As a result, the directional control valve 70 moves into a switching position, in which the connections 89 and 94, the connections 90 and 93 and the connections 91 and 92 are respectively connected to each other. Therefore, the control chamber 47 of the directional control valve 35 has a control pressure applied to it via the connections 90 and 93 and the changeover valve 73 and the control line 97. This control pressure is also present on the control input 16 of the hydraulic motor 12 via the changeover valve 75 and the control line 98. The control chamber 50 of the directional control valve 35 is relieved of pressure via the control line 96, the changeover valve 72 and the connections 91 and 92 of the directional control valve 70, and via a relief nozzle 77. The directional control valve 35 is therefore moved into a position in which the feed connection 36 is connected via the feed metering diaphragm 48 to the load connection 42 and to the brake connection 46. In the load line 43 and in the feed line 27, a pressure builds up which, via the changeover valve 74, is also present in the annular chamber 15 of the hydraulic cylinder 14 and is finally sufficient to release the brake. Pressure medium delivered by the hydraulic pump 25 can then flow via the feed line 27, the pressure compensator 37, the directional control valve 35 and the load line 43 to the hydraulic motor 12 and, from there, via the load line 25, the restrictor opening 49 of the directional control valve 35 and via the brake valve 41, to the tank 26. The hawser is unwound from the winch 10. In the process, even when a pulling load hangs on the hawser, the brake valve 41 ensures that the outflow of pressure medium from the hydraulic motor 12 to the tank can only take place in a restricted manner so that a specific pressure is maintained in the load line 43. This pressure is sufficient to hold the brake 13 released. In addition, the speed at which the hawser is paid out is determined only by the control pressure, which depends on the deflection of the control lever 81. In this case, the speed of the winch 10 is influenced in two ways. Up to about a deflection angle of 25 degrees, only the directional control valve 35 is adjusted, but not the hydraulic motor 12. The latter remains at the maximum absorption volume and maximum torque. The torque is indicated in FIG. 1 by the radial extent of the fields 85, 86 and 87. After a deflection of the control lever 81 of 25 degrees, the directional control valve 35 is completely open. During further deflection of the control lever 81, the absorption volume of the hydraulic motor 12 is then reduced, as a result of which its rotational speed is increased, but its torque is reduced. This is indicated by the decreasing radial extent of the field 85 in FIG. 1.

If, starting from the neutral position shown, the control lever 81 is pivoted into the hoisting angle range 86, then the directional control valve 70 comes into a position in which the connections 89 and 94 are again connected to each other. However, the connection 90 is now connected to the connection 92 and the connection 91 to the connection 93. The control chamber 47 is therefore depressurized, and the control chamber 50 of the directional control valve 35 has applied to it the pilot control pressure dependent on the deflection angle of the control lever 81. This pressure is also present on the control input 16 of the hydraulic motor 12. The directional control valve moves into its second operating position, in which the pressure medium delivered by the displacement pump 25 can flow via the feed line 27, the pressure compensator 37, the connections 36 and 44 with the feed metering diaphragm 48 located between them, and via the load line 45, to the hydraulic motor 12. The outflow of the pressure medium from the hydraulic motor 12 takes place via the load line 43 and the connections 42 and 38 of the directional control valve 35 to the tank 26. In the load line 45 and in the feed line 27, a load-dependent pressure is built up which is sufficient to release the brake 13. The hawser is then wound up on the winch 10.

If the control lever 81 is pivoted still further into the mooring angle range 87, then the directional control valve 70 passes into a switching position in which the connections 88 and 94 are connected to the connection 89. Accordingly, the bypass line 66 is open for the flow of pressure medium, and the annular space 15 of the hydraulic cylinder 14 is connected to the bypass line downstream of the nonreturn valve 71. The connection 91 of the directional control valve 70 is blocked off. The connections 92 and 93 are connected to the connection 90, and therefore to the control output on the pressure reducing valve 69. The same pilot control pressure is therefore present in both the control chambers of the directional control valve 35, so that the latter returns into the mid position on account of its spring centering. The pilot control pressure is also present on the inlet 16 of the hydraulic motor 12. In this case, the control cam of the control disk 83 is configured in such a way that, at the start of the mooring angle range, the pilot control pressure is so high that the hydraulic motor is set to its minimum absorption volume. The torque that can be exerted by the hydraulic motor 12 is therefore also a minimum. As the deflection of the control lever 81 increases in the mooring angle range 87, the pilot control pressure decreases continuously, so that the absorption volume and therefore the torque that can be exerted by the hydraulic motor 12 increases continuously. This is beneficial in terms of working physiology.

In the mooring angle range 87, pressure medium can still flow to the connection 22 of the hydraulic motor 12 only via the bypass line 66. This feed flow is limited by the nozzle 67, so that in the mooring mode, the rotational speed of the hydraulic motor and therefore the speed with which the hawser is wound up is limited. This is important for operational safety. This is because, since the control lever 81 in the mooring angle range 87 maintains its position, even without the action of an external force, there is the possibility that a person will firstly place the control lever in the mooring angle range and then do something with the hawser or stay in the area of the hawser. As a result of the nozzle 67, the speed at which the hawser is moved is now limited to a low speed. Even if the hawser breaks, the speed at which the hawser is then wound up is low, because of the nozzle 67, even though it may be somewhat higher than under load.

Figure 2:
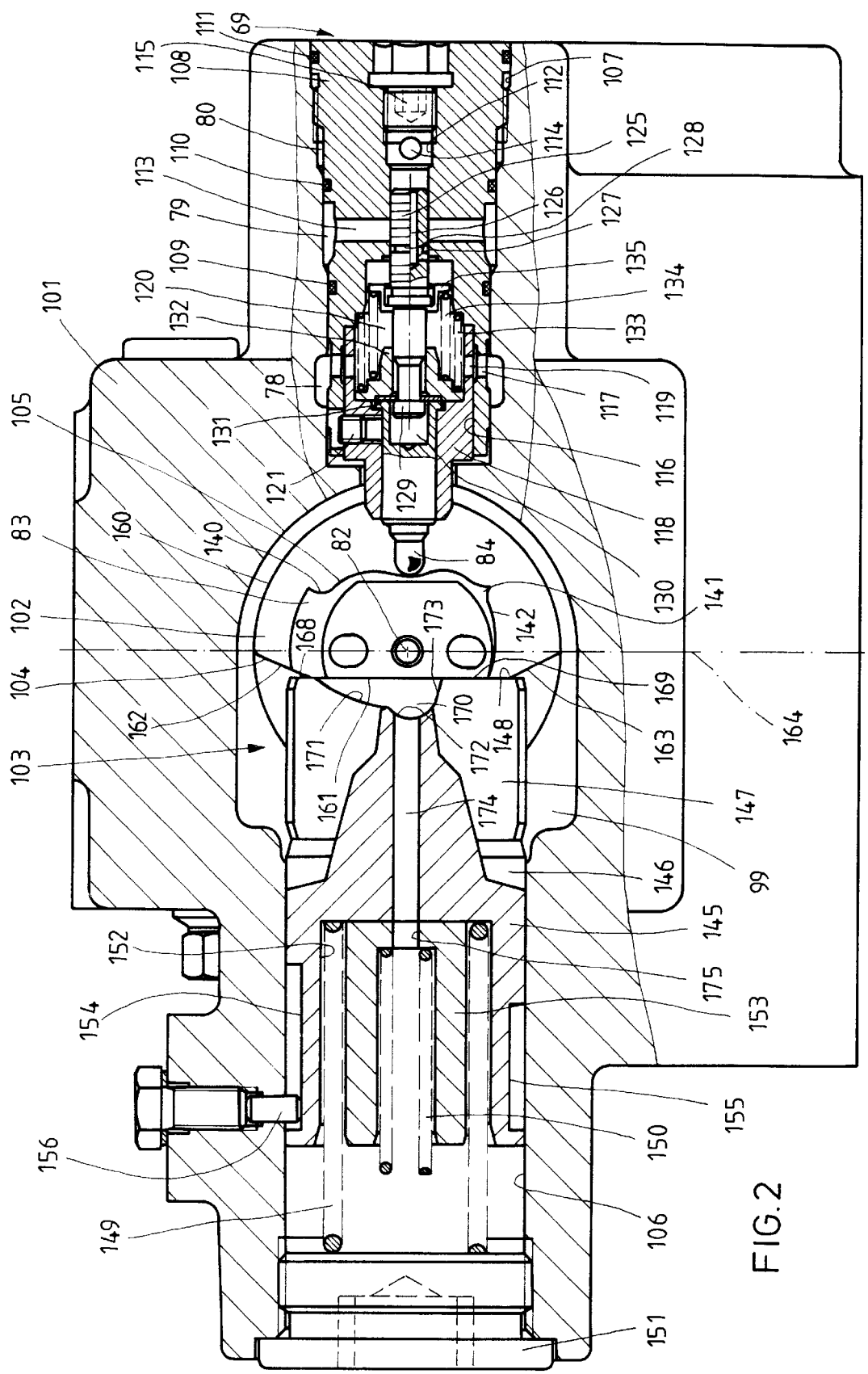
FIG. 2 shows a partial section through a pilot controller at right angles to the axis of the control lever, the section plane for the restoring device and the housing being a different one from that for the pilot control valve.

The control lever 81 is fixed to a shaft which is not specifically illustrated in the figures but projects from the housing 101 of the pilot controller 65 and with which, as FIG. 2 reveals, within the housing 101 a cam disk 102 with a cam track 104 cooperating with a restoring device 103, and the control disk 83 axially immediately adjacent to the cam disk 102 and having a control cam 105 cooperating with the plunger 84 of the pressure reducing valve 67 are coupled in a rotationally secure manner. The cam track 104 and the control cam 105 are in each case part-cylindrical surfaces which extend axially over a certain distance. The cam disk 102 and the control disk 83 are located in a relatively large cavity 99 in the housing 101, into which there open two housing bores 106 and 107 which are located diametrically opposite but, in accordance with the axial offset of the cam disk 102 and control disk 83, are likewise offset axially in relation to each other. The housing bore 106 accommodates the parts of the restoring device 103. The pressure reducing valve 69 is inserted into the housing bore 107.

This pressure reducing valve 69 can be adjusted externally in such a way that a quite specific pilot control pressure prevails in the duct 80 at a selected deflection angle of the control lever 81. At this selected deflection angle, the intention is for the directional control valve 35 to be fully open and for the displacement of the hydraulic motor 12 to begin. For the purpose of adjustment, the pressure reducing valve 69 has a control sleeve 108, which is screwed into the housing bore 107 from the externally open end of the latter. The control sleeve 108 is stepped three times on the outside and, at each step, has a seal 109, 110 and 111. Formed between the seal 109 with the smallest diameter and the middle seal 110, between the control sleeve 108 and the housing 110, is an annular chamber, which is part of the control pressure supply duct designated by 79 in FIG. 1 and in which there prevails the pressure regulated by the pressure reducing valve 68 at the level of 40 bar. Axially between the two seals 110 and 111, on the outside of the control sleeve 108, there is a further annular chamber, which belongs to the pilot control pressure duct 80 from FIG. 1. A further annular chamber between the control sleeve 108 and the housing 101 is created in front of the seal 109, this annular chamber belonging to the leakage duct 78 from FIG. 1.

The central passage 112 through the control sleeve 108 has sections lying axially one behind another with different cross sections. A bore section with the smallest diameter is located axially approximately between the seals 109 and 110 and, via two radial holes 113, is open to the annular chamber 79. It merges outward into a bore section which is somewhat larger and partially provided with an internal thread and from which there lead radial holes 114 which open into the annular chamber 80. Screwed into the bore section is a grub screw 115, by means of which the aforementioned bore sections are closed off to the outside. On the other side of the grub screw 115, the passage is formed as an internal polygon, on which a tool can be attached for the purpose of rotating and therefore for the purpose of axial adjustment of the control sleeve 108. The bore section into which the radial holes 113 open merges inward into an accommodation chamber 116, which is again stepped and from which radial holes 117 lead into the annular chamber 78. Inserted into this accommodation chamber 116 is a guide bush 118 for the plunger 84 of the pressure regulating valve 69, said plunger being captively secured therein by a grub screw 121. The guide bush has radial holes 119, via which, together with an annular chamber placed between the control sleeve 108 and the guide bush 118, a spring chamber 120 formed between the control sleeve 108, the guide bush 118 and the plunger 84 is connected to the annular chamber 78 and therefore to the tank.

The passage section into which the radial holes 113 open is used as a guide bore for a control piston 125 and, together with the control piston, controls the connections between the various annular chambers 78, 79 and 80. The edges between the radial holes 113 and the bore section, on the one hand, and the edge between the bore section and the relatively large spring chamber 120, on the other hand, form the control edges in this case. The control piston 125 is a hollow piston having an axial blind bore 126, which is open toward the radial holes 114 and is connected via a plurality of radial holes 127 to the outer side of the control piston. The radial holes 127 merge on the outside into an annular groove 128. The axial extent of the annular groove, including the radial holes 127, is slightly smaller than the clear axial spacing between the control edges on the control sleeve 108, so that it is possible to separate the blind bore 26 with a positive overlap both from the radial holes 113 and from the spring chamber 120. The control piston 125 extends through the spring chamber 120 and projects with a head 129 into a blind bore 130 in the plunger 84. With the head 129, it engages behind a disk 131, which is arranged between the plunger 84 and a spring plate 132, and holds the head 129 in the manner of a slotted securing ring. A restoring spring 133 accommodated by the spring chamber 120 and intended for the plunger 84 is supported at one end on the control sleeve 108 and at the other end, via the spring plate 132 and the disk 131, on the plunger 84 and presses the plunger against the control cam 105. Also accommodated by the spring chamber 120 is a control spring 134, which is clamped in between a spring plate 135 bearing on a shoulder of the control piston 125 and the spring plate 132, and which ensures that, in the rest position shown of the plunger 84, the head 129 of the latter bears on the disk 131.

The pressure limiting valve 69 is arranged with respect to the axis of the control lever 81 such that the axis of the plunger 84 intersects the axis 82 of the control lever 81 at right angles. Starting from a central neutral line, in which its distance from the axis 82 is a minimum and on which the plunger 84 bears in the neutral position of the control lever 81, the control cam 105 is initially of the same shape on both sides. Its distance from the axis 82 increases continuously. Toward one side, the control cam 105 ends in a surface section 140 which extends radially outward, for which the plunger 84 acts as a stop and which therefore limits the pivoting angle of the control lever 81 in one direction. In the other direction, approximately at the same distance from the center line as the control cam section 140, there is a small elevation 141, on account of which, during the pivoting of the control lever 81, the torque rises briefly and it is therefore indicated to the operator that a change is being made from one operating range into a second operating range. Following the elevation 141, the distance of the control cam from the axis 82 decreases in the control cam section 142.

In the neutral position of the control cam 105 shown in FIG. 2, the plunger 84 and, with it, the control piston 125 of the pressure reducing valve 69 is in a position in which the annular chamber 80 has a fluidic connection to the annular chamber 78 via the blind hole 126, the radial holes 127, the spring chamber 120, the radial holes 119 and the radial holes 117. If the control lever is then deflected, then the plunger 84 is displaced into the control sleeve 108. Via the control spring 134, the control piston 125 is carried with it, so that the connection between the blind hole 126 and the annular chamber 78 is interrupted, and a connection between the blind hole 126 and the annular chamber 79 is opened. From the latter, pressure medium can then flow through the control piston 125 into the annular chamber 80 and onwards to one or both control chambers 47 and 50 of the directional control valve 35. A pressure is built up by means of which the control piston 125 is pushed back against the control spring 134 until equilibrium prevails between the hydraulic force and the spring force. The control piston 125 then assumes a control position. The level of the pilot control pressure in the annular chamber 80 is in this case determined by the prestress which the control spring 134 has in the given position of the plunger 84 in the control position of the control piston 125. This prestress, and therefore also the pilot control pressure in the given plunger position, can be adjusted. For this purpose, the control sleeve 108 is screwed somewhat into the housing 101 or somewhat out of the housing 101. As a result, the control position of the control piston 125 also changes and, therefore, at a given plunger position, the prestress of the control spring 134 and therefore the level of the pilot control pressure. The pilot control pressure increases as a result of the control sleeve 108 being screwed in, and decreases as a result of said control sleeve being screwed out. For a selected position of the control lever 81, a specific pilot control pressure can therefore be adjusted. Away from the selected position of the control lever 81, on the other hand, specimen scatter may still occur, since the stiffness of the control springs used in different specimens varies.

The restoring device 103 comprises a pressure piece 145 which is guided in the housing bore 106 by a cylindrical section 146 and by a double flat 147, whose flat faces are aligned perpendicular to the axis 82, said pressure piece 145 projecting into the hollow chamber 99 and being pressed against the restoring cam track 104 with its end 148 extending parallel to the axis 82. A pressing force is exerted over the entire pivoting range by a restoring spring 149. In addition, in the mooring angle range designated by 87 in FIG. 1, a further pressure spring 150 acts. The springs are located in a spring chamber between the pressure piece 145 and a closing screw 151 screwed into the housing bore 106. In order to accommodate springs of the necessary length, the pressure piece 146 has a blind hole 152 which is open toward the closing screw 151 and between whose base and the closing screw 151 the restoring spring 149 is clamped. Within the restoring spring 149 there is a bush 153, which is likewise open to the closing screw 151 and in whose blind hole the pressing spring 150 is accommodated for the major part. In the position shown in FIG. 2 of the pressure piece 145, in which the latter is at its greatest distance from the closing screw 151, the pressing spring 150 is completely unstressed. The pressing spring 150 becomes effective only after a specific travel of the pressure piece 145 toward the closing screw 151.

Within the guide section 148, the pressure piece 145 has, on its outer side, two diametrically opposite, axially extending grooves 154 and 155, which are of different lengths but begin at the same distance from that end of the pressure piece 145 which faces the closing screw 151. A pin 156, which is held in the housing 101, engages in the groove 154 with slight play. The pressure piece 145 is secured against rotation by the pin 156. The groove 154 is sufficiently long for the axial movement of the pressure piece 145 not to be limited by the pin 156.

The cam track 104 is substantially composed of four flat cam sections which can be distinguished from one another. One cam section 160 extends over 180 degrees around the axis 82 and is circularly cylindrically curved, that is to say has the same distance from the axis 82 everywhere. In the neutral position of the control lever 81 and therefore of the cam track 104, as shown in FIG. 2, the axial plane 164 which goes through the axis 82 and the ends of the cam section 160 is perpendicular to the axis of the pressure piece 145. Between the two ends of the cam section 160 there are three flat, level cam sections 161, 162 and 163, which run at an angle to one another. The central cam section 161 of these three cam sections extends at a short distance from the plane 164, parallel to the latter. The two cam sections 162 and 163 run at an angle to the cam section 161 toward the cam section 160.

That end 148 of the pressure piece 145 which faces the cam track 104 has two level surface sections 168 and 169 which are aligned with each other and perpendicular to the axis of the pressure piece 145, and extend inward to different extents from the round side surface sections of the double flat 147. In this case, the surface section 169 is substantially longer than the surface section 168. Between these two surface sections, a continuous recess 170 perpendicular to the flat sides is introduced into the end 148 and, starting from the inner end of the surface section 168, is bounded by a uniformly curved surface 171, whose curvature is equal to the curvature of the cam section 160 of the cam track 104. The surface 171 is adjoined by a channel 172, which is located centrally in the end of the pressure piece. One side of the channel 171 merges into the flat surface section 169 at a stop face 173.

Into the channel 172 there opens an axial bore 174 which passes through the pressure piece 145 and in whose extension the base of the bush 153 also has an axial bore 175. The spring chamber that accommodates the springs 149 and 150 is therefore continuously connected fluidically to the hollow chamber 99 in the housing 101. The hollow chamber 99 is in turn located in the leakage line 78.

Figure 3:
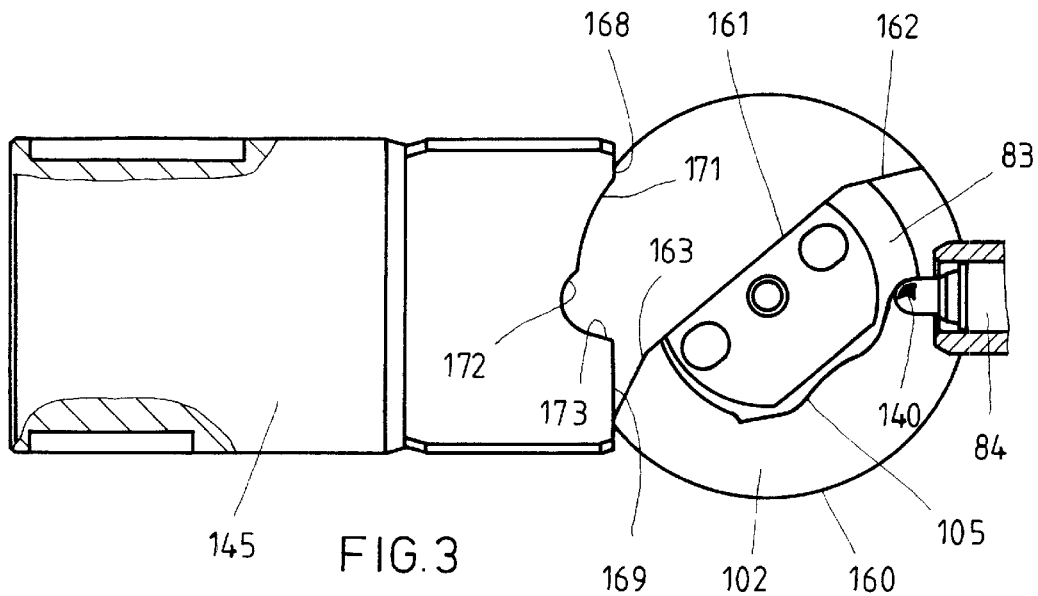
FIG. 3 shows the shaft that can be rotated with the control lever and has cam tracks, the pressure piece of the restoring device and a plunger of the pilot control valve in a position which the parts assume when the control lever is deflected to the greatest extent in the easing direction.

To ease, that is to say to unwind the hawser from the winch 10, the control lever 81 is pivoted into the easing angle range 85 according to FIG. 1. As a result, the control disk 83 and the cam disk 102 are rotated in the clockwise direction in the view of FIG. 2. In the process, firstly the corner between the cam sections 161 and 163 slides along on the surface section 169 of the pressure piece 145. As a result, the pressure piece is displaced in the direction of the closing screw 151, so that the prestress of the restoring spring 149 is increased continuously. If the control lever is released at any point, then the pressure piece 145 and the control lever return into the neutral position shown in FIG. 2, under the action of the restoring spring 149. However, if the control lever 81 is pivoted still further in the direction of easing, then the cam section 163 finally rests flat on the surface section 169 of the pressure piece 145. During a further deflection of the control lever, the point of action of the pressure piece 145 moves abruptly further away from the axis 82 of the control lever toward the corner between the cam section 163 and the cam section 160. This manifests itself in a steep rise in the torque exerted by the restoring device 103 of the control lever. This indicates to the operator that the directional control valve 35 from FIG. 1 is now completely open and, during the further pivoting of the control lever 81, the absorption volume of the hydraulic motor 12 will be reduced. When the cam sections 163 and 169 rest flat on each other, then the pilot control pressure should have the specific level which is set by adjusting the pressure regulating valve 69. During further deflection, the corner between the cam section 160 and the cam section 163 then slides along on the surface section 169, as a result of which the pressure piece 145 is displaced further in the direction of the closing screw and the restoring spring 149 is prestressed further. Finally, an end position is reached as shown in FIG. 3. The control disk 83 has struck the plunger 84 of the pressure reducing valve 69 with the section 140 of the control cam 105 and can no longer be rotated further. If the control lever is released, it returns into its neutral position again under the action of the restoring device 103.

Figure 4:
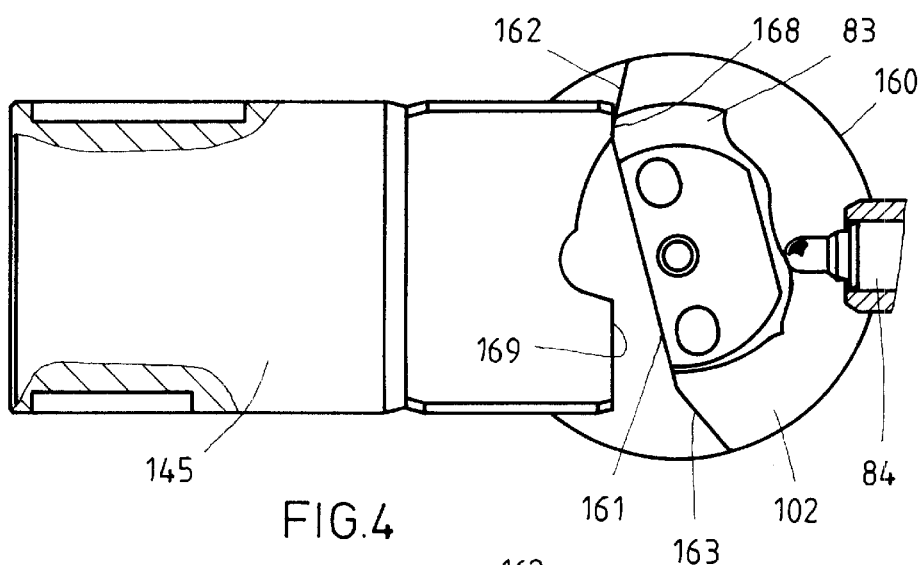
FIG. 4 shows the same parts as in FIG. 3, in a position in which the control lever has been deflected through 15 degrees from its neutral position into the hoisting angle range.
Figure 5:
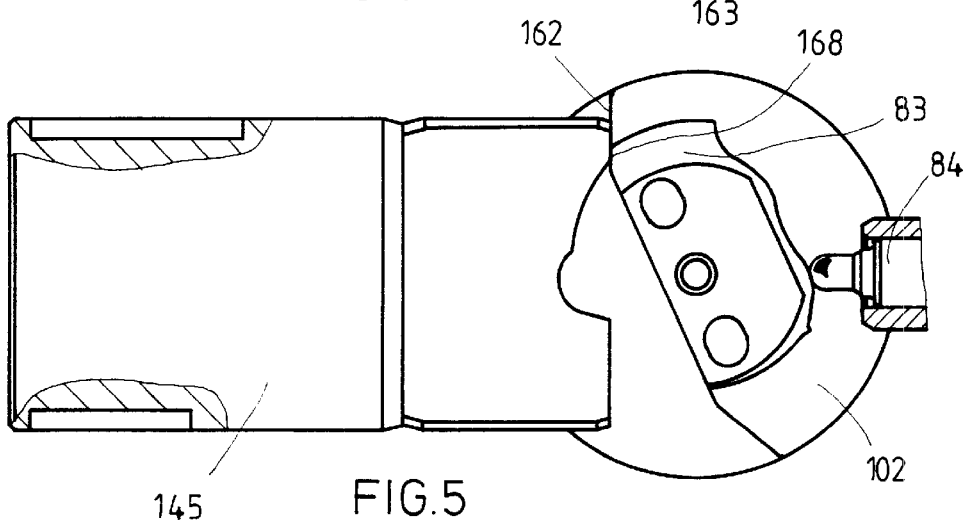
FIG. 5 shows the same parts as in FIG. 4 after a deflection of the control lever through 25 degrees.
Figure 6:
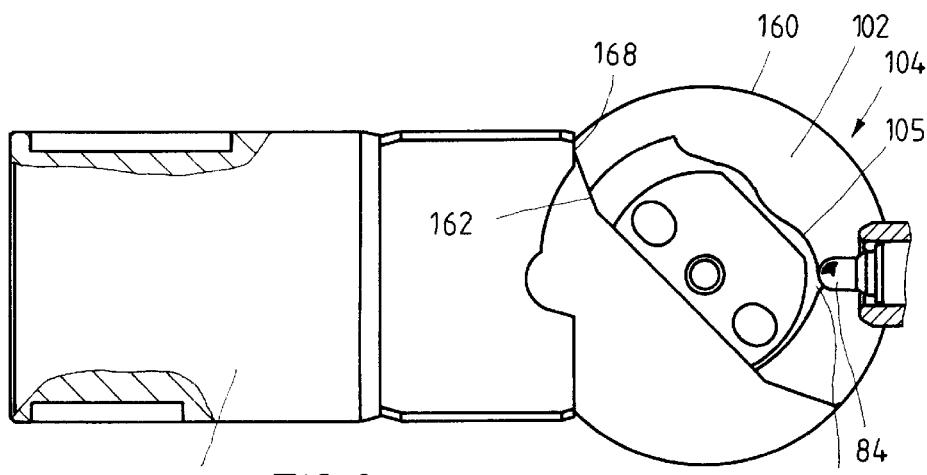
FIG. 6 shows the parts from FIG. 5 after a deflection of the control lever through 45 degrees, as far as the end of the hoisting angle range.

If the control lever 81 is pivoted from its neutral position, in which, as FIG. 2 reveals, the cam section 161 of the cam track 104 and the surface sections 168 and 169 of the pressure piece 145 bear flat on one another, in the direction of hoisting, then the control disk 83 and the cam disk 102 are rotated in the counter-clockwise direction in the view of FIG. 2. The pressure piece 145 acts on the cam track 104 at the corner between the cam sections 161 and 162, as shown in FIG. 4. During the further pivoting of the control lever 81, the cam section 162 of the cam track 102 finally comes to bear flat on the surface section 168 of the pressure piece 145. This state is shown in FIG. 5. During further pivoting of the control lever 81, the operator notices a sharp rise in the necessary actuating force and is therefore given an indication that the absorption volume of the hydraulic motor 12 is then being adjusted. Finally, the surface 168 of the pressure piece 145 bears on the corner between the cam section 162 and the cam section 160 of the cam track 104, as FIG. 6 shows. There, the control lever 81 has already been rotated to such an extent that the plunger 84 of the pressure reducing valve 69 has struck the elevation 141 on the control cam 105. This manifests itself to the operator in a further pressure point during the pivoting of the control lever 81. This indicates that, during further pivoting of the control lever, the hoisting angle range 86 will be left. When the control lever 81 is released in the hoisting angle range, the restoring device 103 is able to return the control lever into its neutral position again, since any further deflection of the control lever in this range is associated with an increase in the prestress of the restoring spring 149.

Figure 7:
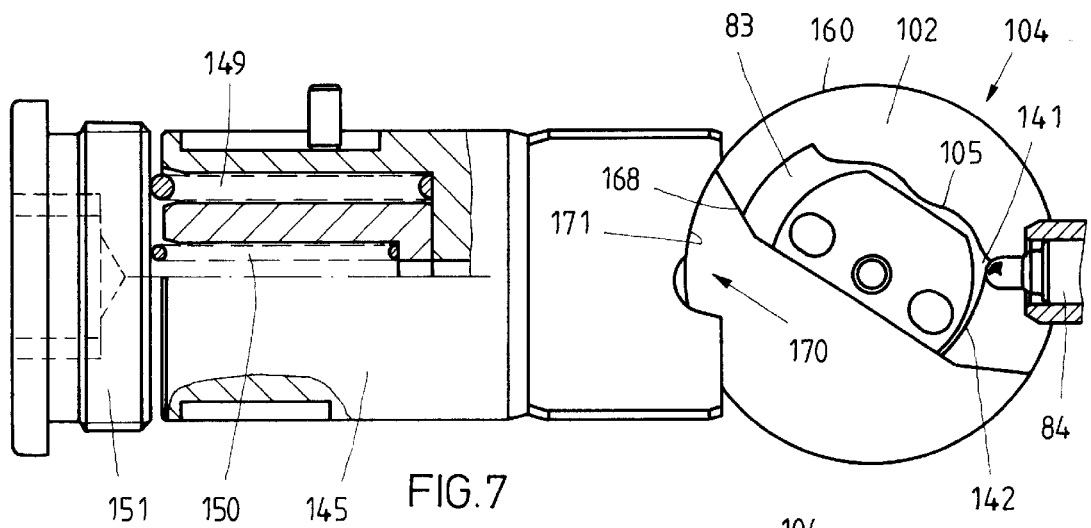
FIG. 7 shows the parts from FIG. 6 after a deflection of the control lever through 57 degrees as far as the start of the mooring angle range.
Figure 8:
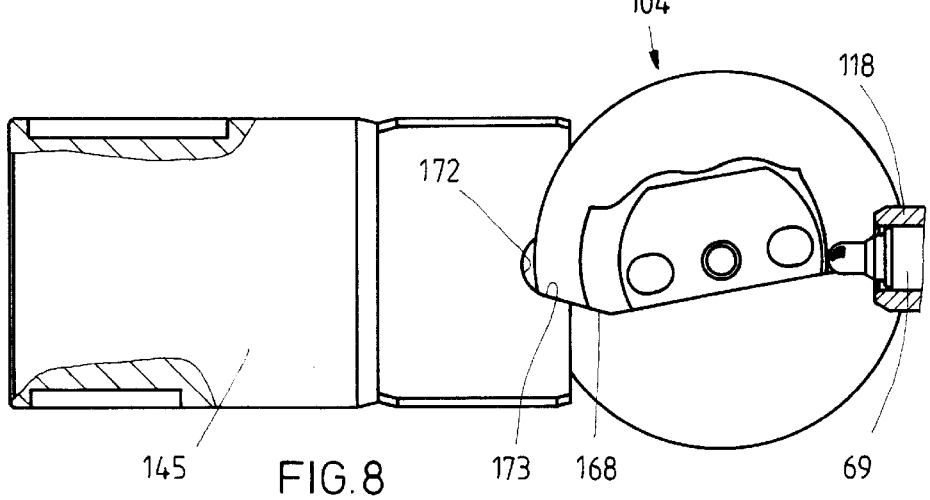
FIG. 8 shows the parts from FIG. 7 after the control lever has been pivoted through 100 degrees as far as the end of the mooring angle range.

If the control lever is pivoted further, with the increased expenditure of effort, which is needed for the plunger 84 to overcome the elevation 141, then, first of all, the edge between the two cam sections 168 and 160 and, to an ever increasing extent, the cam section 160, passes into the region of the recess 170 in the pressure piece 145, where the cam section 160 bears on the surface 171 of the recess 170. In the positions shown in FIG. 8 of the individual components, the pressure piece 145 has been displaced to such an extent in the direction of the closing screw 151 that the pressing spring 150 is still just located in an unstressed condition between the pressure piece and the closing screw. During the further rotation of the cam disk 102 in the counter-clockwise direction, the pressure piece is displaced still further toward the closing screw and, as a result, the pressing spring 150 is stressed, until finally the edge between the cam sections 160 and 168 of the cam track 104 passes into the region of the recess 170 in the pressure piece 145. FIG. 7 shows a state in which the plunger 84 has just overcome the elevation 141 on the control cam 105, and the cam section 160 of the cam track 104 has dipped slightly into the recess 170 and bears on the surface 171 there. The pressure piece 145 is then pressed against the cam section 160 of the cam track 104 by the force of the spring 149 and additionally by the force of the spring 150. Since the curvatures of the cam section 160 and of the surface 171 are the same, further pivoting of the control lever no longer leads to increased prestressing of the springs 149 and 150. These therefore no longer exert any restoring force on the control lever. The control lever is located in the mooring angle range 87. The distance between the hoisting angle range and the mooring angle range is about 10 degrees, in which the plunger 84 overcomes the elevation 141 on the control cam 105. The increase in the pilot control pressure which occurs in the process has no effect on the directional control valve 35 or the hydraulic motor 12, since at the end of the hoisting angle range, the directional control valve 35 is fully open and the hydraulic motor 12 is set to its smallest absorption volume. At the end of the mooring angle range 87 from FIG. 1, the cam section 168 of the cam track 104 strikes the stop face 173 of the recess 170, as shown in FIG. 8. Further pivoting of the control lever 81 is no longer possible.

On the other side of the elevation 141, the control cam 105 in the region 142 is shaped such that with further deflection of the control lever, the plunger 84 emerges further and further from the guide bush 118, so that the springs of the pressure reducing valve 69 exert a torque on the control lever 81 with the effect of further deflection. The frictional forces between the pressure piece 145 and the cam disk 102 and between the plunger 84 and the control disk 83 are so high, however, that the control lever maintains its position in the mooring angle range even when it is released.

FIG. 8 also reveals in particular the effect of the channel 172 in the recess 170 in the pressure piece 145. By means of this channel, an exchange of pressure medium between the spring chamber with springs 149 and 150 and the hollow chamber 99 in the housing 101 is ensured in a simple way even if the control lever 81 has been pivoted as far as the end of the mooring angle range.

The groove 155 in the pressure piece 145 is of no significance for a control arrangement with a mooring mode of the winch. However, not every winch is also provided for the mooring mode. The groove 155 permits the pressure piece 145 also to be used for a winch without the mooring mode. For this purpose only, as compared with the state shown in FIG. 2, it is incorporated in the housing 101 rotated through 180 degrees about its longitudinal axis. The pin 156 then engages in the groove 155. Because of the shortness of this groove, the pin 156 limits the travel by which the pressure piece 145 can be displaced toward the closing screw 151. This therefore provides a stop for the control lever at the end of the hoisting angle range. The pin 156 can likewise become effective at the end of the easing angle range. Depending on the length of the groove 155, however, it is possible for the plunger 84 already to have struck the surface 140 of the control cam 105 previously. The groove 155 therefore permits a pilot controller for a winch without the mooring mode and a winch with the mooring mode to be constructed with the same pressure piece 145. Likewise, an existing winch can be converted.

We claim:
1. A hydraulic control arrangement for operating a winch (10) in the easing, hoisting and mooring mode, comprising
an adjustable hydraulic motor (12) to drive the winch (10),
a proportionally adjustable directional control valve (35), spring-centered in a mid position, to control the flow paths of a pressure medium between a pressure medium source (25), the hydraulic motor (12) and a pressure medium supply container (26),
a pilot controller (65) to control adjustment of the directional control valve (35) and of the hydraulic motor (12) and having a control lever (81) which is actuatable as desired and deflectable from a neutral position in one direction over a specific easing angle range (85) for easing at different speeds and deflectable in an opposite direction over a specific hoisting angle range (86) for hoisting at different speeds, and
during a deflection of the control lever (81) over the entire hoisting angle range (86), the directional control valve (35) being fully opened and the hydraulic motor (12) being adjusted to a minimum absorption volume, and wherein
the control lever (81), as viewed from the neutral position, is deflectable over a mooring angle range (87) on an other side of the hoisting angle range (86), and wherein with increasing deflection of the control lever (81) in the mooring angle range (87), the hydraulic motor (12) is adjusted in a direction of a greater absorption volume.

2. The hydraulic control arrangement as claimed in claim 1, wherein a torque needed to deflect the control lever (81) rises noticeably between the hoisting angle range (86) and the mooring angle range (87).

3. The hydraulic control arrangement as claimed in claim 1, further comprising
a throttle (67) and a second directional control valve (70), and wherein at a transition of the control lever (81) from the hoisting angle range (86) to the mooring angle range (87), said second directional control valve (70) is changable over into a mooring position in which the throttle (67) is located in a flow path of the pressure medium leading via the hydraulic motor (12), with effect of limiting rotational speed of the hydraulic motor (12) to small values when winding up cable.

4. The hydraulic control arrangement as claimed in claim 3, wherein the throttle (67) and the second directional control valve (70) are arranged in series with each other and in a bypass line (66) to the first directional control valve (35), and wherein at the transition of the control lever (81) from the hoisting angle range (86) to the mooring angle range (87), the first directional control valve (35) is brought into a mid position in which the feed of pressure medium to the hydraulic motor (12) under pressure is blocked by the first directional control valve (35).

5. The hydraulic control arrangement as claimed in claim 4, wherein the pilot controller (65) is a hydraulic pilot controller, and wherein the first directional control valve (35) is actable on with a pilot control pressure in a first pilot control chamber (47) in a position of the control lever (81) in the easing angle range (85), is actable on by a pilot control pressure in a second pilot control chamber (50) in a position of the control lever (81) in the hoisting angle range (86), and is actable on by the same pilot control pressure, also present on the hydraulic motor (12), in both pilot control chambers (47,50) in a position of the control lever (81) in the mooring angle range (87).

6. The hydraulic control arrangement as claimed in claim 5, wherein the pilot controller (65) comprises an adjustable pilot valve (69) with a pilot control pressure connection (80) which, via said second directional control valve (70) that is operated by deflection of the control lever (81), is connected to the first pilot control chamber (47) during a movement of the control lever (81) in the easing angle range (85), is connected to the second pilot control chamber (50) during a movement of the control lever (81) in the hoisting angle range (86), and is connected to both pilot control chambers (47,50) of the first directional control valve (35) during a movement of the control lever (81) in the mooring angle range (87).

7. The hydraulic control arrangement according to claim 4, wherein in series with a feed metering throttle (48) which is opened proportionally during a displacement of the proportionally adjustable directional control valve (35) from the mid position, there is arranged a pressure compensator (37) that maintains a fixed pressure difference across the feed metering throttle (48), and wherein the bypass line (66) circumvents the pressure compensator (37) and the directional control valve (35).

8. The hydraulic control arrangement as claimed in claim 4, further comprises a nonreturn valve (71), which is arranged in the bypass line (66) and opens in the direction of flow of pressure medium from the pressure medium source (25) to the hydraulic motor (12), and a pressure limiting valve (60), which is arranged between two connections (21,22) of the hydraulic motor (12) and by means of which pressure on the connection (22) of the hydraulic motor (12) to which pressure is applied in the mooring mode is limited to a maximum value.

9. The hydraulic control arrangement as claimed in claim 8, wherein a pressure reducing valve (68) is connected to the bypass line (66), upstream of the throttle (67), and wherein the nonreturn valve (71) is arranged between the pressure reducing valve and the pressure medium source (25).

10. The hydraulic control arrangement as claimed claim 3, wherein a hydraulically releasable mechanical brake (13) is provided for the winch (10), and wherein, in the mooring position of the second directional control valve (70), pressure fluid is directed to the brake (13) via one of said first and second directional control valves.

11. The hydraulic control arrangement as claimed in claim 1, further comprising a restoring device (103) for the control lever (81), which comprises a restoring spring (149) which, in the easing angle range (85) and in the hoisting angle range (86) is prestressed to a greater extent as the deflection of the control lever (81) increases, while an adjustment of the control lever (81) in the mooring angle range (87) is independent of the prestress of the restoring spring (149).

12. The hydraulic control arrangement as claimed in claim 11, wherein a cam disk (102) having a cam track (104) is rotationally securely connected to the control lever (81), on which disk a pressure piece (145) of the restoring device (103) bears under the action of restoring spring (149), and wherein the cam track (104) has a neutral cam section (160) which is independent of the position of the pressure piece (145) and on which the pressure piece (145) bears when the control lever (81) is in the mooring angle range (87).

13. The hydraulic control arrangement as claimed in claim 12, wherein the pressure piece (145) is movably guided radially with respect to the axis of rotation (82) of the control lever (81), and the cam track (104) is located on the periphery of the cam disk (102), and wherein the neutral cam section (160) is formed by a circular or circularly cylindrical arc.

14. The hydraulic control arrangement as claimed in claim 13, wherein the angular spacing of the mooring angle range (87) from the neutral position of the control lever (81) is less than 90 degrees, and wherein the pressure piece (145) has a recess (170) which is bounded by a circular arc or a circular cylinder (171), into which the neutral cam section (160) of the cam disk (102) dips at the start of the mooring angle range (87).

15. The hydraulic control arrangement as claimed in claim 12, wherein, in the mooring angle range (87), the pressure piece (145) is pressed against the cam disk (102) by a second spring (150) in addition to the restoring spring (149).

16. The hydraulic control arrangement as claimed in claim 15, wherein the second spring (150) lies loosely in a spring chamber in the hoisting angle range (86), wherein there is an angular spacing between the hoisting angle range (86) and the mooring angle range (87), and wherein the second spring (150) is tensioned as a result of displacement of the pressure piece (145) in the angle range between hoisting and mooring.

17. The hydraulic control arrangement as claimed in claim 16, wherein within the restoring spring (149) there is a bush (153) which faces the pressure piece (145) with its base, and wherein the second spring (150) is accommodated in the bush (153).

18. The hydraulic control arrangement as claimed claim 12, wherein the deflection of the control lever (81) at the end of the easing angle range (85) and at the end of the mooring angle range (87) is in each case limited by a stop face (140, 162) on a part (83, 102) that corotates with the control lever (81) and by an opposing stop (84, 173), and wherein the pressure piece (145) has a stop (155) by means of which, depending on the manner of installation of the pressure piece (145) and/or of an opposing stop, the travel of the pressure piece (145) is limited in the direction of higher prestressing of the restoring spring (149) at the end of the hoisting angle range (86) or not.

19. The hydraulic control arrangement as claimed in claim 18, wherein the circular-arc or circularly cylindrical recess (170) in that end (148) of the pressure piece (145) which faces the cam disk (102) is arranged asymmetrically with respect to the axis of the pressure piece (145) and ends in a stop face (173) for the cam disk (102).

20. The hydraulic control arrangement as claimed in claim 18, wherein the pressure piece (145) is rotationally secured by a groove (154) extending in its guide direction and by a pin (156) engaging in this groove (154), and wherein there is a second groove (155), which is preferably located diametrically opposite the first groove (154), with respect to the axis of the pressure piece (145), and which is shorter than the first groove (154).

* * * * *